United States Patent
Burns et al.

(10) Patent No.: US 9,156,560 B2
(45) Date of Patent: Oct. 13, 2015

(54) INTELLIGENT INTEGRATED PROPULSION CONTROL SYSTEM AND METHOD

(71) Applicant: Rolls-Royce Corporation, Indianapolis, IN (US)

(72) Inventors: Donald W. Burns, Avon, IN (US); Robert J. Zeller, Noblesville, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 55 days.

(21) Appl. No.: 14/109,448

(22) Filed: Dec. 17, 2013

(65) Prior Publication Data
US 2015/0005990 A1    Jan. 1, 2015

Related U.S. Application Data

(60) Provisional application No. 61/786,101, filed on Mar. 14, 2013.

(51) Int. Cl.
| | | |
|---|---|---|
| B64D 31/14 | (2006.01) | |
| G01C 23/00 | (2006.01) | |
| B64D 31/00 | (2006.01) | |
| F02C 9/00 | (2006.01) | |
| F02C 7/36 | (2006.01) | |
| G05D 23/00 | (2006.01) | |
| G05D 27/02 | (2006.01) | |

(52) U.S. Cl.
CPC ............... B64D 31/14 (2013.01); B64D 31/00 (2013.01); F02C 7/36 (2013.01); F02C 9/00 (2013.01); G05D 23/00 (2013.01); G05D 27/02 (2013.01); F05D 2220/76 (2013.01); F05D 2270/06 (2013.01); F05D 2270/331 (2013.01); F05D 2270/335 (2013.01); F05D 2270/44 (2013.01)

(58) Field of Classification Search
None
See application file for complete search history.

(56) References Cited

U.S. PATENT DOCUMENTS

| | | | |
|---|---|---|---|
| 3,797,233 A | | 3/1974 | Webb et al. |
| 4,258,545 A | | 3/1981 | Slater |
| 5,048,285 A | | 9/1991 | Schmitt et al. |
| 5,091,843 A | | 2/1992 | Peczkowski |
| 5,134,845 A | | 8/1992 | Romano |
| 5,623,197 A | * | 4/1997 | Roseman et al. ............ 320/134 |
| 6,062,513 A | * | 5/2000 | Lambregts ................... 244/175 |
| 7,011,498 B2 | * | 3/2006 | Vos et al. ......................... 416/28 |
| 7,058,556 B2 | | 6/2006 | Desai et al. |
| 7,107,131 B2 | | 9/2006 | MacDougall |
| 7,188,008 B2 | | 3/2007 | Garnaud et al. |
| 7,285,871 B2 | | 10/2007 | Derouineau |
| 8,948,937 B2 | * | 2/2015 | Constans et al. ................ 701/14 |
| 2005/0001598 A1 | | 1/2005 | Belokon et al. |

(Continued)

FOREIGN PATENT DOCUMENTS

| | | |
|---|---|---|
| EP | 2275346 A2 | 1/2011 |
| EP | 2492451 A2 | 8/2012 |

OTHER PUBLICATIONS

International Search Report PCT/US2013/070511 mailed on Jul. 25, 2014.

*Primary Examiner* — Rami Khatib
(74) *Attorney, Agent, or Firm* — Fishman Stewart Yamaguchi PLLC; Douglas P. LaLone

(57) ABSTRACT

Control systems and methods for an aircraft propulsion system are disclosed in which the propulsion control system is integrated to intelligently control aircraft propulsion and minimize transient effects from the power demands of other aircraft subsystems.

20 Claims, 4 Drawing Sheets

(56) References Cited

U.S. PATENT DOCUMENTS

| | | | |
|---|---|---|---|
| 2008/0058998 A1* | 3/2008 | Breit | 700/295 |
| 2009/0312892 A1 | 12/2009 | Mahoney et al. | |
| 2010/0251726 A1 | 10/2010 | Jones et al. | |
| 2010/0292870 A1 | 11/2010 | Saint Marc et al. | |
| 2011/0178648 A1* | 7/2011 | Calvignac et al. | 700/291 |
| 2012/0248242 A1 | 10/2012 | Gagne et al. | |

* cited by examiner

US 9,156,560 B2

INTELLIGENT INTEGRATED PROPULSION CONTROL SYSTEM AND METHOD

CROSS-REFERENCE TO RELATED APPLICATIONS

This application claims priority to U.S. Provisional Patent Application No. 61/786,101 filed Mar. 14, 2013, the contents of which are hereby incorporated in their entirety.

TECHNICAL FIELD

The present disclosure generally relates to control systems and methods, and more particularly, but not exclusively, to an intelligent integrated propulsion control system and method for aircraft.

BACKGROUND

Aircraft typically include several systems that require power for operation but are controlled separately. The main propulsion system of the aircraft, such as gas turbine engine(s), are typically controlled to meet propulsion requirements of the aircraft from sensed parameters and operator input while power demand from other systems of the aircraft are treated as parasitic losses from the propulsion system. Furthermore, thermal systems of aircraft are typically controlled separately from propulsion control.

The growing performance demands for electrical and thermal aircraft subsystems to be operable in high energy applications imposes transient effects on the propulsion system that impact the ability to operate the aircraft to meet propulsion output requirements. While engine size can be increased to meet increasing power demands from the aircraft systems, weight is added to the aircraft, increasing fuel burn and decreasing efficiency. Some existing systems have various shortcomings relative to certain applications. Accordingly, there remains a need for further contributions in this area of technology.

SUMMARY

One embodiment of the present disclosure is a unique control system and method for an aircraft propulsion system. Another embodiment of the present disclosure involve unique systems and methods in which the propulsion control system is integrated to intelligently control aircraft propulsion and minimize transient effects from the power demand of other aircraft subsystems. Other embodiments include apparatuses, systems, devices, hardware, methods, and combinations for aircraft propulsion control. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
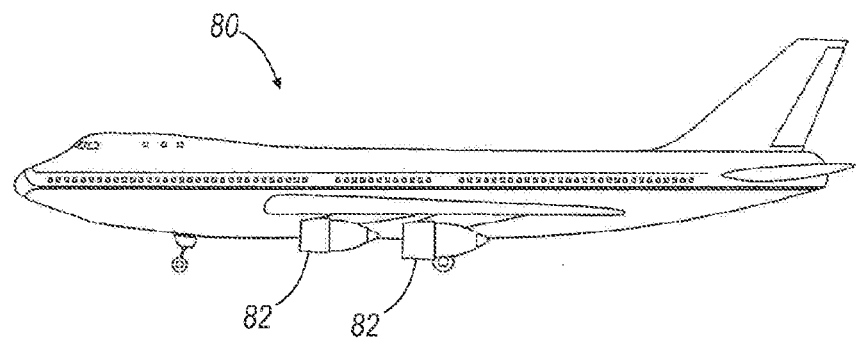
FIG. 1 is an elevation view of one embodiment of an aircraft including a propulsion system.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

Figure 2:
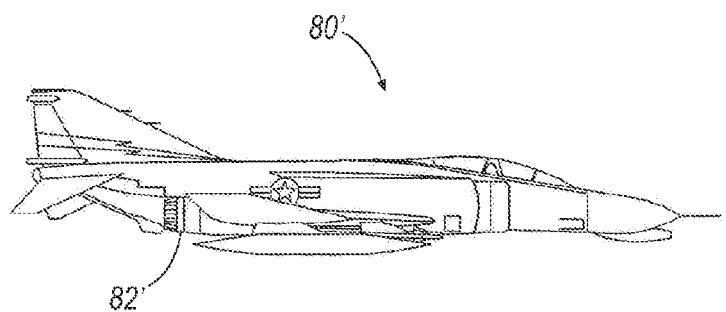
FIG. 2 is an elevation view of another embodiment of an aircraft including a propulsion system.

With reference to FIG. 1, there is illustrated one form of an aircraft 80 including one or more aircraft engines 82 that are used as a powerplant for propulsion of aircraft 80. Though the aircraft 80 is depicted as having multiple engines 82 in the illustrated embodiment, in some forms the aircraft 80 can have a single engine, such as shown with aircraft 80' and engine 82' in FIG. 2. Whether having a single or multiple engines, any given engine 82, 82' in any given application can take a variety of forms such as reciprocating engines and gas turbine engines that provide propulsion of aircraft 80, 80'. The engine(s) 82, 82' can be capable of powering useful devices of various subsystems aboard the aircraft 80, 80', such as, but not limited to, heat management subsystems; nozzle and thrust vectoring subsystems; electrical power subsystems including energy storage devices, power distribution devices, generators, and starters; weapons subsystems; and cockpit subsystems including cockpit lights, instruments, navigational aids and communication devices, to set forth just a few non-limiting examples. The engine(s) 82, 82' can also be, but are not necessarily, used to power a generator and provide environmental control aboard the aircraft 80, 80'.

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present disclosures are contemplated for utilization in other applications that may not be coupled with an aircraft such as, for example, industrial applications, power generation, pumping sets, naval propulsion and other applications known to one of ordinary skill in the art.

The aircraft engines 82 and 82' can take any variety of forms. In some embodiments the aircraft engines 82 and 82' are the same, but in other embodiments the engines 82 and 82' can be different and/or can perform different functions. To set forth just a few non-limiting examples of the forms that either or both of the engines 82 and 82' can take, reference is made to one embodiment of aircraft engine 82 in FIG. 3.

Figure 3:
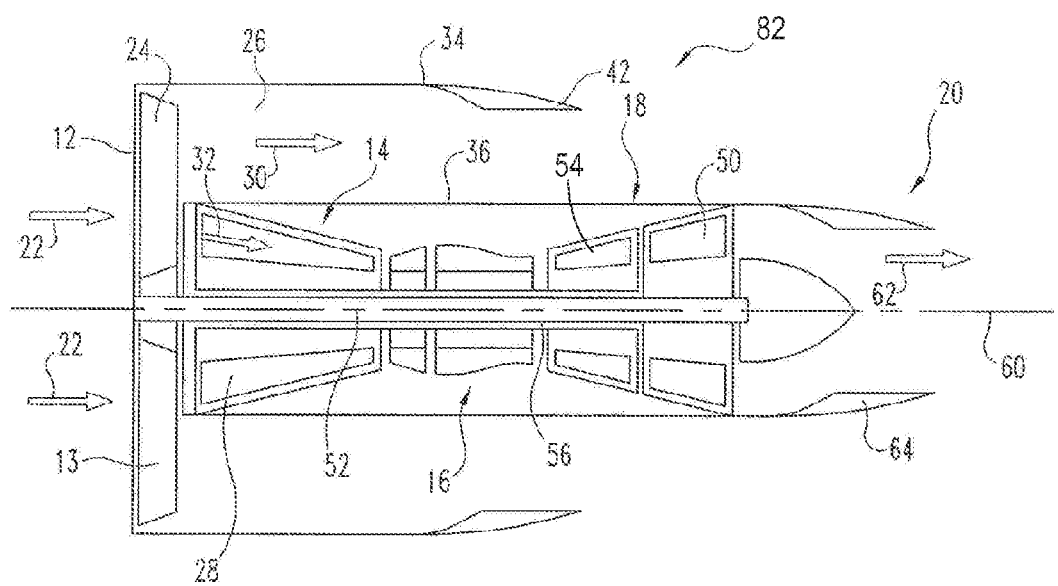
FIG. 3 schematically illustrates some aspects of a non-limiting example of a propulsion system including a gas turbine engine in accordance with an embodiment of the present disclosure.

The illustrative embodiment in FIG. 3 depicts aircraft engine 82 as a gas turbine engine and is shown including an inlet section 12, a fan section 13, a compressor section 14 for compressing an air, a combustor section 16 for burning a mixture of fuel and the compressed air, a turbine section 18 used to expand the combusted mixture of fuel and air, and an exhaust section 20. Though the gas turbine engine 82 is shown as a single spool turbojet engine, other embodiments can include additional numbers of spools and can take other forms such as turbofan, turboprop, or turboshaft. In some embodiments the gas turbine engine 82 can be an adaptive cycle and/or variable cycle engine. It is contemplated that the engine 82 can have other variations and forms other than the few listed above. However significant details regarding gas turbine engine design and operation will not be presented herein as it is believed that the theory of operation and general parameters of gas turbine engines are well known to those of ordinary skill in the art.

In operation of the illustrated embodiment of engine 82, air illustrated by arrows 22 is drawn in through the inlet section 12 and passes through at least one fan stage 24 of the fan section 13 where the ambient air is compressed to a higher pressure. After passing through the fan section 13, the air can be split into a plurality of flowstreams. In this exemplary embodiment, the airflow is spilt into a bypass duct 26 and a core passageway 28. Airflow through the bypass duct 26 and the core passageway 28 is illustrated by arrows 30 and 32 respectively. The bypass duct 26 encompasses the core passageway 28 and can be defined by an outer circumferential wall 34 and an inner circumferential wall 36. The bypass duct 26 can also include a bypass nozzle 42 operable for creating a pressure differential across the fan 24 and for accelerating the bypass airflow 30 to provide bypass thrust for the turbofan engine 82.

The core airflow 32 enters the core passageway 28 after passing through the fan section 13. The core airflow is then further compressed in the compressor section 14 to a higher pressure relative to both ambient pressure and the air pressure in the bypass duct 26. The air is mixed with fuel in the combustor section 16 wherein the fuel/air mixture burns and produces a high temperature working fluid from which the turbine section 18 extracts power. The turbine section 18 can include low pressure turbine 50 mechanically coupled to the fan section 13 through a low pressure shaft 52 and a high pressure turbine 54 mechanically coupled to the compressor section 14 through a high pressure shaft 56. The shafts 52, 56 rotate about a centerline axis 60 that extends axially along the longitudinal axis of the engine 82 such that as the turbine section 18 rotates due to the forces generated by the high pressure working fluid, the fan section 13 and compressor section 14 section are rotatingly driven by the turbine section 18 to produce compressed air. After passing through the turbine section 18, the core exhaust flow represented by arrow 62 is accelerated to a high velocity through a core exhaust nozzle 64 to produce thrust for the turbofan engine 82.

Figure 4:
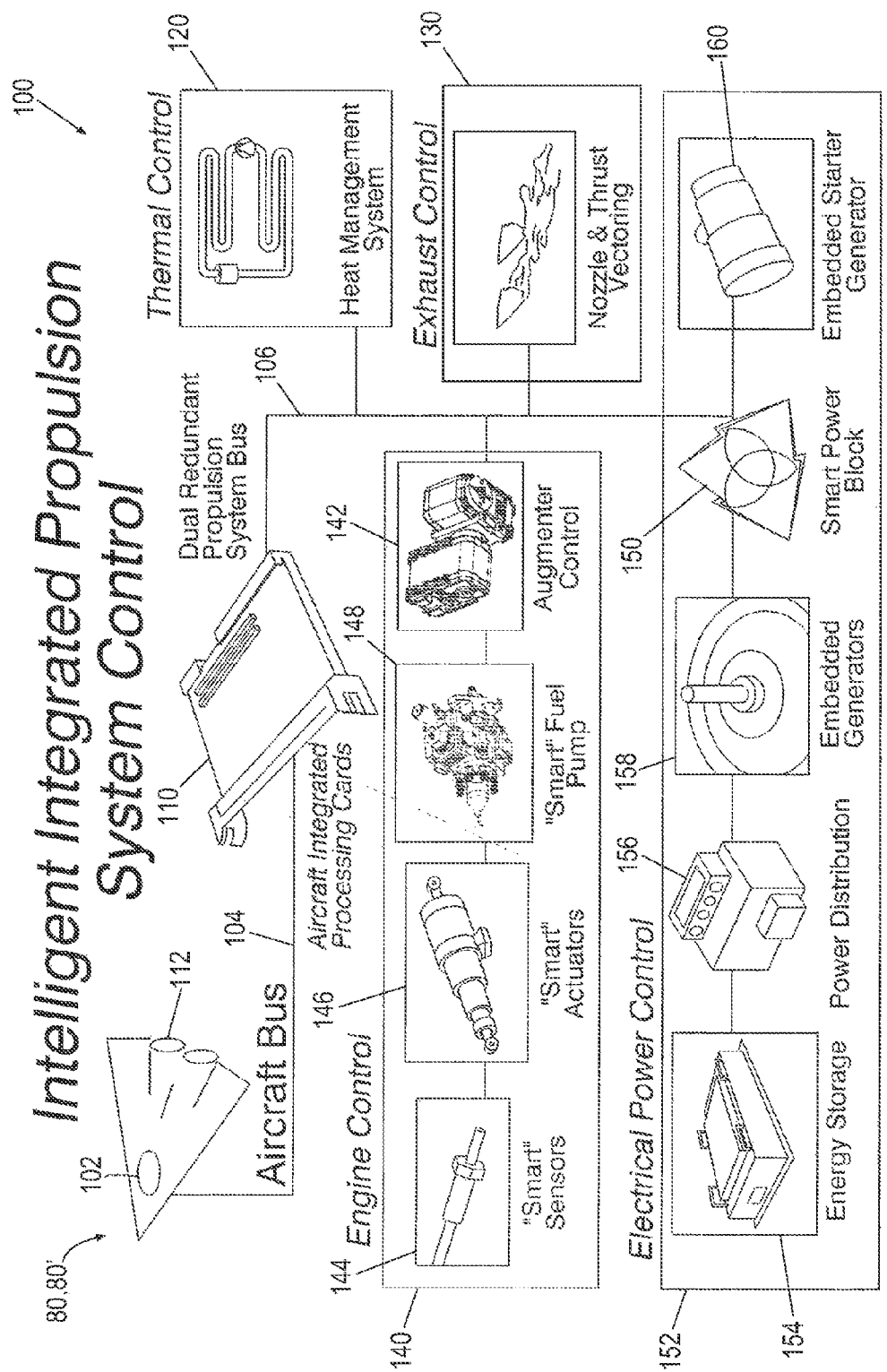
FIG. 4 schematically illustrates some aspects of a non-limiting example of an intelligent propulsion control system employed in conjunction with, for example, the aircraft of FIGS. 1 and 2 and the propulsion system of FIG. 3 in accordance with an embodiment of the present disclosure.

With reference now to FIG. 4, the aircraft 80, 80' is capable of operating at a variety of speeds and operations and includes a propulsion control system 100 to control the total power output from engine 82, 82'. The propulsion control system 100 can include a variety of subsystems connected with a propulsion system controller 110 that controls various aspects of the operation of aircraft 80, 80'. In the illustrated embodiment, propulsion control system 100 includes a propulsion controller 110 that controls operation of a propulsion subsystem 112 and an engine control subsystem 140. Propulsion controller 110 may be connected to a flight condition sensor 102 and other propulsion subsystem 112 components with an aircraft data bus 104. Propulsion controller 110 is further connected to a thermal management subsystem 120, a nozzle and thrust vectoring subsystem 130 when applicable, and electric power subsystem 152 through an electric power controller 150 with a dual redundant propulsion system data bus 106.

The controllers 110, 150 disclosed herein can be comprised of digital circuitry, analog circuitry, or a hybrid combination of both of these types. Other controllers disclosed herein can have the same variations. Also, the controllers can be programmable, an integrated state machine, or a hybrid combination thereof. The controllers can include one or more Arithmetic Logic Units (ALUs), Central Processing Units (CPUs), memories, limiters, conditioners, filters, format converters, or the like which are not shown to preserve clarity. In one form, the controllers are of programmable varieties that execute algorithms and processes data in accordance with operating logic that is defined by programming instructions (such as software or firmware). Alternatively or additionally, operating logic for the controllers can be at least partially defined by hardwired logic or other hardware. In one particular form, one or more of the controllers are configured to operate as a Full Authority Digital Engine Control (FADEC); however, in other embodiments it may be organized/configured in a different manner as would occur to those skilled in the art. It should be appreciated that the controllers can be exclusively dedicated to controlling operation of one or more of the aircraft engines 82, 82' or other subsystem of aircraft 80, 80', or may additionally and/or alternatively be used in the regulation/control/activation of one or more other subsystems or aspects of the aircraft 80, 80' some embodiments of which are described further below.

Some aspects of a non-limiting example of propulsion control 100 employed with engine 82, 82' are schematically illustrated in FIG. 4. In one form, propulsion control system 100 includes an intelligent integrated propulsion system controller 110 that is connected via dual redundant propulsion system data bus 106 with the electrical power controller 150, thermal management subsystem 120, engine control subsystem 140, and, if applicable, nozzle and thrust vectoring subsystem 130 so that the propulsion system operation is managed and controlled holistically to account for anticipatory power demand from the various aircraft power subsystems 120, 130, 152 and optimized to improve propulsion system operation, electrical energy generation, thermal load management, and fuel efficiency.

Propulsion controller 110 is configured to start and operate engine 82, 82' with engine control subsystem 140 in accordance with data collected from flight condition sensor 102 and operator input, and further in accordance with operating algorithms that determine an anticipatory power demand from any one or combination of subsystems 120, 130, 152. Flight condition sensor 102 can be used in a variety of settings for a variety of purposes. In one form the sensor 102 measures aircraft flight conditions such as speed and altitude, to set forth just two non-limiting examples, and can output any variety of data whether sensed or calculated. For example, the sensor 102 can sense and output conditions such as static temperature, static pressure, total temperature, and/or total pressure, among possible others. In addition, the flight condition sensor 102 can output calculated values such as, but not limited to, equivalent airspeed, altitude, and Mach number. Any number of other sensed conditions or calculated values can also be output. The flight condition sensor 102 provides data to the propulsion controller 110 and can output values in either analog or digital form.

The sensor 102 can alternatively and/or additionally be used to monitor any or all of the engine's health, status, and performance. Such a sensor can be coupled with the gas turbine engine 82, 82' or other component of propulsion subsystem 112 and can provide information, whether sensed or calculated, to the propulsion controller 110. The propulsion controller 110 is provided to monitor and/or control engine operations and can be capable of interacting with an operator such as a pilot. Propulsion controller 110 is operative to receive data from operator input and various engine performance and other sensors to control the total power output of engine 82, 82' to meet operator output power demands with engine control subsystem 140, including fuel flow, the position of any variable geometry systems and other flow control devices (for engines so equipped). Furthermore, propulsion controller 110 is operative to receive anticipatory power demand inputs, e.g., from the heat management, nozzle and thrust vectoring, and electrical power subsystems 120, 130, 152 of aircraft 80, 80', and control the total power output of engine 82, 82' to meet anticipatory power demands from any one or combination of these subsystems.

Propulsion controller 110 is further coupled to electric power controller 150. Electric power controller 150 is the primary controller that regulates the output of electrical power from electric power subsystem 152 in response to control inputs from propulsion controller 110, and to control variations in voltage on system power busses to maintain a desired voltage thereon. In particular, electric power controller 150 is the primary controller in a primary/secondary relationship with various inverter/converter controllers that control the output of energy storage subsystem 154, power distribution subsystem 156, embedded generators 158, and embedded starter generator 160 in response to commands from electric power controller 150. In one form, electric power controller 150 is configured to control the output of subsystems 154, 156, 158, 160 via their respective controllers to minimize parasitic power extraction, increase power generation capability, increase fault tolerance of electric power subsystem 152, and provide electrical transient management. Functions of electric power controller 150 include, for example, one or more of providing active power management of electrical power generation and storage sources; controlling power transfer; controlling power sharing; integrating engine 82, 82' feedback to minimize power extraction affects; and regulating bus voltage to maintain consistent voltage during continuous power demands and also during transient power demands. In other embodiments, electric power controller 150 or its functions may be incorporated into one or more other controllers, e.g., into propulsion controller 110.

During operation of aircraft 80, 80', large electrical transients and thermal loading may be experienced that impact the performance of engine 82, 82'. Propulsion control system 100 links the controls outputs of the electrical power, thermal, and, when provided, nozzle and thrust vectoring subsystems 120, 130, 152 so that propulsion controller 150 can anticipate electrical transient loads, thermal loads (both steady state and transient), and vectoring loads to provide propulsion controller 110 the ability to anticipate and react to those loads and offset negative impacts on engine performance when the output power demand to satisfy the load is created. Propulsion controller 110 can be configured to maintain engine stability and engine operability through electrical and thermal transients created by subsystems 120, 130, 152. The interconnection of the propulsion subsystem 112 and propulsion controller 110 with the sensors and/or controllers of subsystems 120, 130, 152 allows an optimization of the overall system to improve propulsion system 112 performance with control commands to engine control subsystem 140.

In one embodiment, propulsion controller 110 includes one or more processors that are integrated with the aircraft avionics systems away from engine heat and vibration. Each of the subsystems 112, 120, 130, 140, 152 includes sensors which locally digitize sensor information and/or local controllers which provide performance and operational data regarding the respective subsystem and transmit this data onto system data bus 106 for use by the propulsion controller 110. In one non-limiting alternative and/or additional embodiment, the fuel system and engine actuation system accept their commands from the data bus and provide local loop closure with confirmation of action transmitted back to the propulsion system control via the data bus. The system data bus 106 also receives digitized information that provides local loop closure with confirmation of action performed by the respective subsystem 120, 130, 140, 152 that is transmitted to the propulsion controller 110 over the system data bus 106. Engine control subsystem 140 includes, for example, augmenter control 142, smart sensors 144, smart engine actuators 146, and smart fuel pump 148 which receive operational signals from propulsion controller 110 to provide engine control and which can provide digitized sensor information over system data bus 106 back to propulsion controller 110. Electric power subsystem 152 is managed by electric power controller 150 which also communicates via digitized signals with propulsion controller 110 over system bus 106. Thermal management subsystem 120 and nozzle and thrust vectoring subsystems 130 can include subcontrollers which digitize information regarding thermal transient and steady state loads and transmit the same over system data bus 106. Electric power controller 150 can also communicate electrical load, transient information and energy management information to propulsion controller 110 to provide intelligence for overall control of propulsion subsystem 112.

Figure 5:
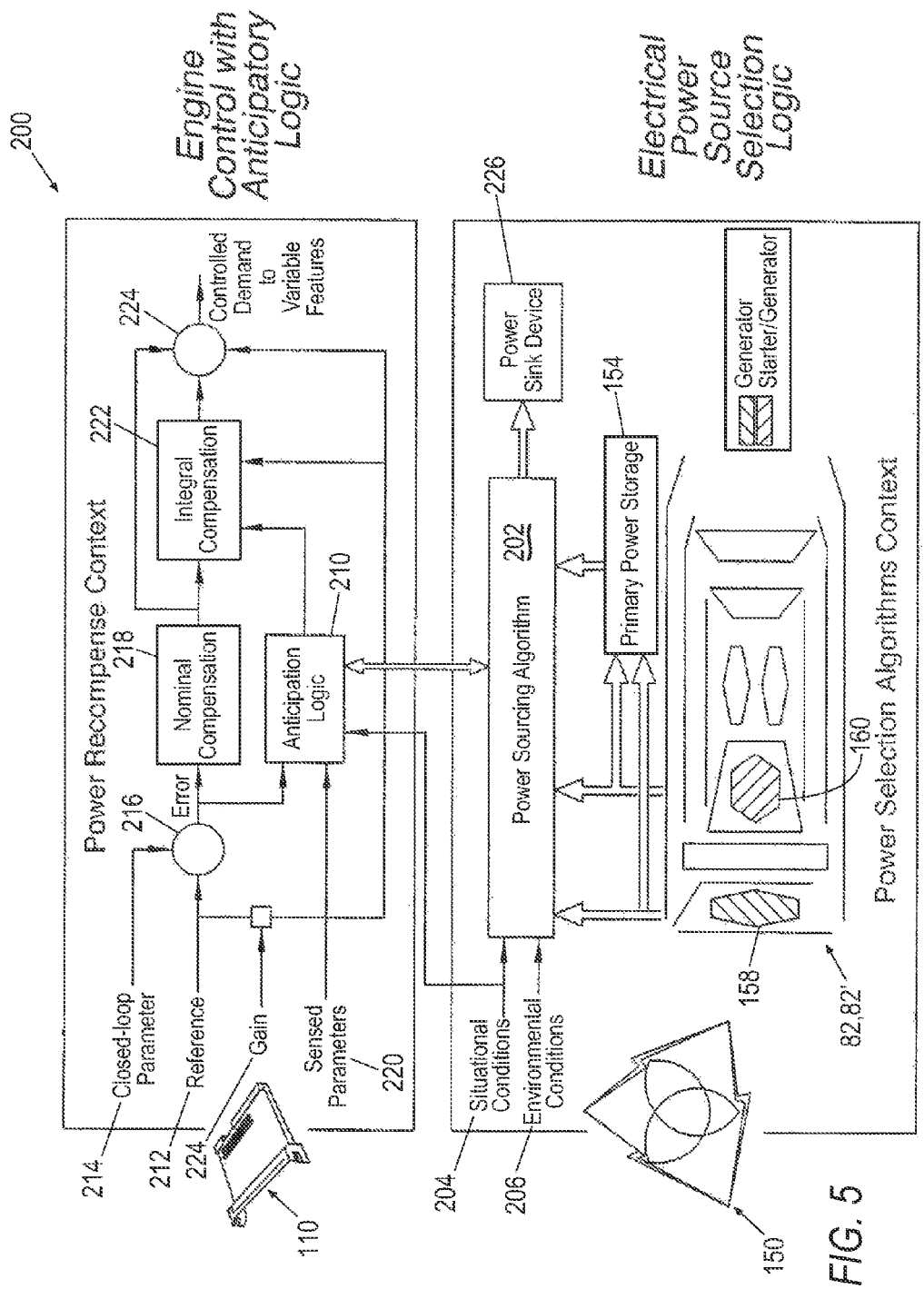
FIG. 5 schematically illustrates a logic diagram for intelligent propulsion system control for use with, for example, the aircraft of FIGS. 1 and 2 and the propulsion system of FIG. 3 in accordance with an embodiment of the present disclosure.

Referring now to FIG. 5, a logic diagram 200 is provided which shows electric power controller 150 interfacing with propulsion controller 110 to inform propulsion controller 110 that a large electrical demand will be requested from electrical power subsystem 152 based on an anticipatory or future electrical power demand determined according to current operating conditions. Propulsion controller 110 is programmed to initiate compensation for the anticipatory electrical power demand in engine 82, 82' prior to engine 82, 82' receiving the increased demand for power output. This allows for a more efficient operation of engine 82, 82' for electrical power generation without adversely impacting the propulsion of aircraft 80, 80'. The anticipatory logic control scheme can also be employed to anticipate steady state and transient thermal loads from thermal management subsystem 120 and/or nozzle and thrust vectoring subsystem 130.

In one embodiment, electric power controller 150 includes a power source algorithm 202 that receives inputs from various sensors regarding situational conditions 204 and environmental conditions 206 associated with the operation of aircraft 80, 80' and electric power subsystem 152. Power source algorithm 202 also receives inputs from embedded generators 158, starter generator 160, and energy storage device 154. Power sourcing algorithm 202 processes these inputs to determine or predict an anticipatory electric power demand from electric power subsystem 152. The anticipatory electric power demand along with the situational conditions 204 and environmental conditions 206 are provided to an anticipatory logic module 210 of propulsion controller 110. Power sourcing algorithm 202 can also provide an output to a power sink device 226 to store or shed excess power when appropriate.

Propulsion controller 110 includes sensed parameters 220 regarding, for example, the operator request for output power and flight conditions, which is input to anticipation logic module 210. Propulsion controller 110 also includes a reference input 212 and a closed loop parameter input 212 associated with the current operating conditions that are evaluated at node 216 to determine nominal power demand and error associated with the same. The error is output to nominal compensation module 218. Nominal compensation module 218 is programmed with a nominal power demand algorithm to compensate for errors in determining nominal power demand requirements to satisfy closed loop control and reference inputs.

The nominal power demand needed to satisfy closed loop control to meet reference targets is provided to anticipation logic module 210 along with the anticipatory electrical power demand from power sourcing algorithm 202. With these inputs, anticipation logic module 210 is programmed to determine the anticipatory power demand from, for example, sensed parameters such as operator requests and flight conditions, situational conditions, and environmental conditions. Integral compensation module 222 receives the nominal power compensation error from the nominal compensation module 218, and receives the nominal power demand and the anticipatory power demand from anticipation logic module 210. Integral compensation module 222 can further receive a gain input 224 to provide further adjustments. Integral compensation module determines a total power demand at node 224 that is controlled to meet the variable features of the nominal power demand and the anticipatory power demand. The controlled total power demand can, for example, prioritize the total power output demand to satisfy the operator request or other critical power requirements before satisfying less critical power demand requirements when feasible.

The other power subsystems 120, 130 disclosed herein can be similarly arranged with controllers programmed with power sourcing algorithms. For example, thermal management subsystem 120 can provide an anticipatory thermal power demand to anticipation logic module 210. In another example, nozzle and thrust vectoring subsystem 130 can provide an anticipatory vectoring power demand to the anticipation logic module 210. In this way, propulsion controller 110 considers anticipatory electrical, thermal and vectoring power demands from the various subsystems and determines a total power demand that satisfies the various anticipatory power demands and the nominal power demand from the operator request in accordance with sensed operational parameters 220, situational conditions 204, and environmental conditions 206. The total power demand is further controlled for nominal error compensation to satisfy current and future operating conditions without negatively impacting aircraft engine performance.

Figure 6:
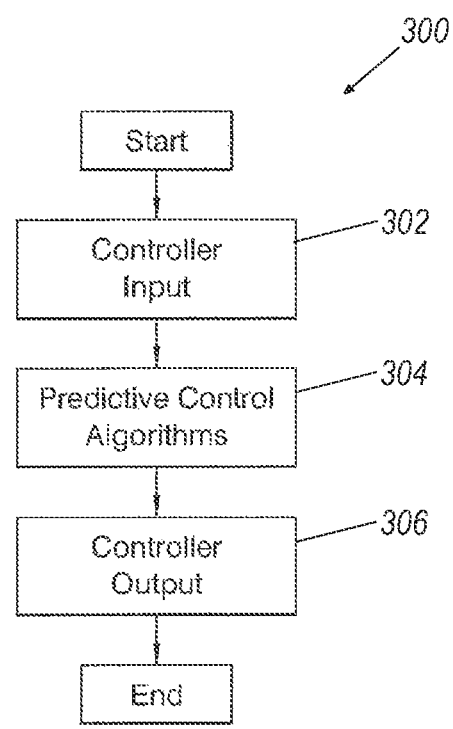
FIG. 6 is a flow diagram of a procedure for intelligent control of the aircraft propulsion system by integrating propulsion and aircraft power system controls.

Referring now to FIG. 6, a flow diagram 300 of a procedure for intelligent control of the aircraft propulsion system by integrating propulsion and aircraft power system controls is illustrated. Procedure 300 includes operation 302 where propulsion controller 110 receives controller input of sensed parameters 220, situational conditions 204, and environmental conditions 206. Propulsion controller 110 also receives inputs of closed loop parameters 214 and reference parameters 212. At operation 304 propulsion controller 110 includes a predictive control algorithm for each of the subsystems 120, 130, 152 that determines an anticipatory thermal, vectoring and/or electric power demand for each of the subsystems 120, 130, 152. Propulsion controller 110 also includes nominal compensation algorithms that determine nominal power demand which is reconciled with the anticipatory power demands to provide a controller output of the total power demand at operation 306.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosures are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system, comprising:
    at least one aircraft engine operable to generate a power output in response at least in part to an operator power request and sensed parameters from a flight sensor;
    an engine control subsystem configured to control operation of the at least one aircraft engine;
    an electrical power subsystem including at least one electrical power device that is operable to demand electric power during operation of the at least one aircraft engine; and
    a propulsion controller connected to the engine control subsystem and to the electrical power subsystem with a propulsion system data bus, wherein the propulsion controller is configured to determine an anticipatory electric power demand of the at least one electrical device based on current operating conditions and provide control signals to the engine control subsystem to control the at least one aircraft engine to generate the power output to meet a total power demand, wherein the total power demand includes at least the anticipatory electric power demand and a nominal power demand based at least in part on the operator power request, and wherein the propulsion controller is configured to initiate compensation for the anticipatory electric power demand prior to the at least one aircraft engine receiving an increased demand for power output.

2. The system of claim 1, further including a thermal management subsystem including a heat source, wherein the thermal management subsystem is connected to the propulsion controller with the propulsion system data bus, wherein the propulsion controller is further configured to determine an anticipatory thermal power demand of the thermal management subsystem based on the current operating conditions, and the total power demand includes at least the anticipatory electric power demand, the anticipatory thermal power demand, and the nominal power demand.

3. The system of claim 1, further including a nozzle and thrust vectoring subsystem that is connected to the propulsion controller with the propulsion system data bus, wherein the propulsion controller is further configured to determine an anticipatory vectoring power demand of the nozzle and thrust vectoring subsystem based on current operating conditions, and the total power demand includes at least the anticipatory electrical power demand from the electrical power subsystem, the anticipatory thermal power demand from the thermal management subsystem, the vectoring power demand from the nozzle and thrust vectoring subsystems and the nominal power demand.

4. The system of claim 1, wherein the engine control subsystem includes at least one actuator connected to the at least one aircraft engine and at least one fuel pump connected to the at least one aircraft engine.

5. The system of claim 4, wherein the engine control subsystem further includes at least one sensor connected to the at least one aircraft engine and at least one fuel augmenter connected to the at least one aircraft engine.

6. The system of claim 1, wherein the electrical power subsystem includes at least one energy storage device, at least one power distribution device, at least one embedded generator, and at least one embedded starter generator.

7. The system of claim 6, wherein the electrical power subsystem includes an electric power controller connected to the propulsion system data bus, wherein each of the least one energy storage device, the at least one power distribution device, the at least one embedded generator, and the at least one embedded starter generator is connected to the electric power controller.

8. The system of claim 1, further comprising an aircraft including the at least one aircraft engine, the engine control subsystem, the electric power subsystem, and the propulsion controller.

9. The system of claim 1, further comprising an electrical power controller that includes a power source algorithm that processes sensor inputs to predict the anticipatory electric power demand and provides an output to a power sink device to store or shed excess power.

10. A system comprising:
at least one propulsion control system including a propulsion controller connected via a first data bus to at least one flight condition sensor, wherein the propulsion controller is configured to determine a nominal power demand of at least one aircraft engine according to parameters sensed by the flight condition sensor and an operator power request;
an engine control subsystem connected to the propulsion controller with a propulsion system data bus, wherein the engine control system is configured to receive signals from the propulsion controller to control operation of the at least one aircraft engine; and
at least one subsystem connected to the propulsion controller with the propulsion system data bus, wherein the propulsion controller is configured to at least one of determine an anticipatory power demand from current operating conditions of the at least one subsystem based on operational data received from the at least one subsystem over the propulsion system data bus or receive the anticipatory power demand from the at least one subsystem over the propulsion system data bus, wherein the propulsion controller is further configured to determine a total power demand that includes the nominal power demand and the anticipatory power demand and signal the total power demand to the engine control system to control the at least one aircraft engine to produce an output power that satisfies the total power demand;
wherein the at least one propulsion controller initiates compensation for the anticipatory power demand prior to the at least one aircraft engine receiving the operator power request.

11. The system of claim 10, wherein the at least one subsystem includes an electric power subsystem and the anticipatory power demand is an anticipatory electric power demand of the electric power subsystem.

12. The system of claim 11, wherein the electric power subsystem includes at least one electric power controller and the electric power controller is configured to determine the anticipatory electric power demand and provide the anticipatory electric power demand to the propulsion controller via the propulsion system data bus.

13. The system of claim 10, wherein the at least one subsystem includes a thermal management subsystem and the anticipatory power demand is an anticipatory thermal power demand of the thermal management subsystem.

14. The system of claim 10, wherein the at least one subsystem includes a nozzle and thrust vectoring subsystem and the anticipatory power demand is an anticipatory vectoring power demand of the nozzle and thrust vectoring subsystem.

15. The system of claim 10, wherein the anticipatory power demand includes a future electrical power demand based on the current operating conditions of the at least one subsystem.

16. A method comprising:
determining a nominal power demand of at least one aircraft engine of an aircraft;
determining an anticipatory power demand from at least one subsystem of the aircraft, wherein the anticipatory power demand includes at least one of anticipatory electrical transient loads and anticipatory thermal loads from the at least one subsystem;
determining a total power demand that includes the nominal power demand and the anticipatory power demand; and
prior to the aircraft engine receiving an increased demand for power output, controlling the at least one aircraft engine to produce a power output that satisfies the total power demand.

17. The method of claim 16, further comprising a propulsion controller configured to determine the nominal power demand, the anticipatory power demand, and the total power demand.

18. The method of claim 17, wherein controlling the at least one aircraft engine includes providing control signals to an engine control subsystem, wherein the engine control system is configured to control fueling and actuation of the at least one aircraft engine to produce the output power that satisfies the total power demand.

19. The method of claim 16, wherein the anticipatory power demand includes one of anticipatory electrical transient loads from an electric power subsystem and anticipatory transient and steady state thermal loads from a thermal management subsystem.

20. The method of claim 16, wherein determining the anticipatory demand includes determining the demand based on a future power electrical demand that is determined based on current operating conditions.

* * * * *